United States Patent [19]

Kitagawa et al.

[11] 4,431,705
[45] Feb. 14, 1984

[54] SHRINKABLE POLYAMIDE FILM AND PROCESS FOR ITS PRODUCTION

[75] Inventors: Kiyoshi Kitagawa, Hirakata; Atsushi Komatsuzaki, Ohtsu, both of Japan

[73] Assignee: Unitika Ltd., Amagasaki, Japan

[21] Appl. No.: 361,242

[22] Filed: Mar. 24, 1982

[30] Foreign Application Priority Data

Apr. 14, 1981 [JP] Japan ................................ 56-56486
Apr. 14, 1981 [JP] Japan ................................ 56-56487

[51] Int. Cl.$^3$ ............................ B32B 27/08; C09J 7/02
[52] U.S. Cl. ................................. 428/476.1; 428/341; 428/349; 428/474.4; 428/523
[58] Field of Search ............ 428/475.8, 474.4, 475.5, 428/476.1, 349, 35, 523, 341

[56] References Cited

U.S. PATENT DOCUMENTS

| | | | |
|---|---|---|---|
| 3,661,677 | 5/1972 | Wang | 428/475.8 X |
| 3,746,565 | 7/1973 | Schneider et al. | 428/475.8 X |
| 3,805,848 | 4/1974 | Chrow | 428/475.8 X |
| 3,826,676 | 7/1974 | Heling | 428/475.8 X |
| 3,908,070 | 9/1975 | Marzolf | 428/475.8 X |

Primary Examiner—Thomas J. Herbert, Jr.
Attorney, Agent, or Firm—Oblon, Fisher, Spivak, McClelland & Maier

[57] ABSTRACT

A shrinkable polyamide film useful for wrapping hams, sausages, etc. The shrinkable film has a hydrothermal shrinking ratio of at least 30% in both MD and TD and a hydrothermal shrinkage stress of from 300 to 700 g/mm$^2$. The film is produced by a process which comprises biaxially stretching a substantially amorphous film composed of a copolymer of 6,6-nylon/6-nylon in a weight ratio of from 5/95 to 25/75 at a temperature of not higher than 120° C. and at a stretching ratio of at least 2.5 times in both MD and TD, and subjecting the stretched film to stress relaxation at a temperature of from the stretching temperature to 170° C., followed by winding it up. Further, a shrinkable film having an oxygen gas permeability of not more than 20 cc/m$^2$·24 hrs. atm. as well as the above properties may be obtained by coating a polyvinylidene chloride resin prior to the stretching so that its solid content after the stretching becomes to be at least 0.5 g/m$^2$.

1 Claim, No Drawings

SHRINKABLE POLYAMIDE FILM AND PROCESS FOR ITS PRODUCTION

BACKGROUND OF THE INVENTION

1. Field of the Invention

The present invention relates to a shrinkable polyamide film and a process for its production, and particularly to a shrinkable polyamide film having good gas impermeability and a process for its production.

A primary object of the present invention is to provide a shrinkable polyamide film for wrapping, which is highly shrinkable and strong and has a shrinkage stress within a range of from 300 to 700 g/mm$^2$ which is suitable for various applications. A secondary object of the present invention is to provide a shrinkable polyamide film which has high gas impermeability as well as the above properties.

2. Description of the Prior Art

As shrinkable plastic films, films composed of copolymers of polyvinyl chloride, polyvinylidene chloride, polylefins, etc. are available, and they are used for wrapping hams, sausages and various other articles. However, these films have certain drawbacks, for instance, such that they lack strength and are susceptible to rupture or formation of pin holes, or they lack oxygen impermeability and tend to permit the penetration of oxygen through the wrapping films, thus leading to degradation of the quality of the wrapped articles.

As shrinkable polyamide films, films composed mainly of a 6-nylon homopolymer or a copolymer of m-xylylenediamine with an aliphatic carboxylic acid, are available, and they are superior in their strength. However, the films of a 6-nylon homopolymer have high crystallinity and accordingly a low hydrothermal shrinking ratio, and they are likely not to well fit on the wrapped contents. Whereas, the films made of said copolymer have a high Young's modulus and a high hydrothermal shrinkage stress, and they tend to lead to a deformation of the wrapped contents or rupture of sealing portions. Further, these films likewise lack oxygen impermeability and tend to lead to degradation of the quality of the wrapped contents due to the penetration of oxygen through the films.

There is no shrinkable film presently available which has good gas impermeability. Thus, there is a strong demand in the wrapped food industry for the development of shrinkable films having good gas impermeability.

SUMMARY OF THE INVENTION

Under the circumstances, the present inventors have now made it possible to produce a shrinkable polyamide film having great anti-pinhole strength, a high shrinking ratio and a proper shrinkage stress, and a shrinkable polyamide film having good gas impermeability.

The present invention provides a shrinkable polyamide film having a hydrothermal shrinking ratio of at least 30% in both MD (machine direction) and TD (transverse direction) and a hydrothermal shrinkage stress of from 300 to 700 g/mm$^2$. Such a shrinkable polyamide film can be produced by a process which comprises biaxially stretching a substantially amorphous film composed of a copolymer of 6,6-nylon/6-nylon in a weight ratio within a range of from 5/95 to 25/75 at a temperature of not higher than 120° C. and at a stretching ratio of at least 2.5 times in both MD and TD, and subjecting the stretched film to stress relaxation at a temperature of from the stretching temperature to 170° C., followed by winding it up.

The present invention further provides a shrinkable polyamide film coated, on at least one side thereof, with a polyvinylidene chloride resin, and the film has, in addition to the above-mentioned properties, an oxygen gas permeability, i.e. transmission rate, of not more than 20 cc/m$^2$·24 hrs. atm. as measured by the Mocon method. This shrinkable polyamide film can be prepared by a process similar to the above process except that prior to the stretching, a polyvinylidene chloride resin is coated on the surface of the substantially amorphous film so that its solid weight after the stretching becomes to be at least 0.5 g/m$^2$.

DETAILED DESCRIPTION OF THE PREFERRED EMBODIMENTS

As a result of an investigation of the physical properties required for shrinkable films, the present inventors have found that the shrinking ratio and the shrinkage stress are the most important properties for the shrinkable films. The properties of the films of the presetn invention, i.e. the hydrothermal shrinking ratio of at least 30% and the shrinkage stress within a range of from 300 to 700 g/mm$^2$, satisfy these property requirements. If the hydrothermal shrinking ratio is less than 30%, it is likely that a space will be formed between the content and the wrapping bag because of lack of the film shrinkage, and the commercial value of the content will thereby be impaired. If the margin of the wrapping bag left for the content is minimized to eliminate the formation of this space, the efficiency of the operation for filling the commercial product will be lowered. On the other hand, if the shrinkage stress is less than 300 g/mm$^2$, the shrinking force tends to be smaller than the frictional force between the content and the wrapping bag, and wrinkles are thereby likely to be formed. If the shrinkage stress is greater than 700 g/mm$^2$, the shrinking force tends to be too strong and it is likely that the content will thereby be deformed or the sealed portion will thereby be ruptured.

For the determination of the hydrothermal shrinking ratio, a film in an equilibrium state in an atmosphere of 65% RH at 20° C. is immersed in hot water at 100° C. for 5 minutes and then left to stand until it returns to an equilibrium state under the initial conditions, whereupon the difference of the size of the film as compared with the initial size is represented by percentage. The value represented by the percentage is used as the hydrothermal shrinking ratio. The hydrothermal shrinkage stress is the maxium value of the stress which appears in a longitudinal direction when a film having a width of 10 mm and a length of 100 mm is immersed in hot water at 100° C. with its length maintained to be unchanged and with its width left to be free.

Further, films will be more useful if they have superior gas impermeability. Even in the case of a polyvinylidene chloride copolymer shrinkable film which is said to have the best gas impermeability among the presently available films, the oxygen permeability as measured by the Mocon method is as high as from 30 to 40 cc/m$^2$·24 hrs. atm. Accordingly, films having higher gas impermeability are desired.

The shrinkable film of the present invention having an oxygen permeability of not more than 20 cc/m$^2$·24 hrs. atm. has been developed to meet this demand. With use of this shrinkable film, the shelf life of e.g. hams can remarkably be prolonged. This presents a considerably great industrial benefit. The Mocon method here is meant for the measurement in a measurement atmosphere of 100% RH at 20° C. by means of OX-Tran 100 Model oxygen permeability measuring device manufactured by Modern Control Co.

The present inventors have conducted extensive researches to develop shrinkable films having the above mentioned properties and have succeeded in accomplishing the present invention.

Firstly, as a result of the extensive researches on various materials such as polyamides and their copolymers and mixtures, it has been found that a random copolymer of 6,6-nylon/6-nylon having a monomer weight ratio of 6,6-nylon/6-nylon within a range of from 5/95 to 25/75 is most suitable as the material to meet the requirements for the shrinking ratio and the shrinkage stress as well as other properties such as a strength and transparency required as a wrapping material, and the present invention has been accomplished.

The 6,6-nylon here is meant for polyhexamethylene adipamide, and the 6-nylon is meant for poly-ε-capramide.

The shrinkable polyamide film of the present invention has a hydrothermal shrinking ratio as high as at least 30% and a hydrothermal shrinkage stress of a proper level of from 300 to 700 g/mm$^2$, and thus it satisfies the property requirements for various wrapping purposes, such as wrapping hams, sausages, etc.

Now, the practical embodiments of the present invention will be described.

The polyamide to be used in the present invention is a copolymer composed of 6,6-nylon/6-nylon in a weight ratio within a range of from 5/95 to 25/75. A substantially amorphous film composed of the 6,6-nylon/6-nylon copolymer having the above composition is biaxially stretched under the conditions such that the stretching temperature is not higher than 120° C., preferably from 60° to 90° C., the streching ratio is at least 2.5 times in both MD and TD, and the stress relaxation temperature is not more than 170° C., preferably from 110° to 140° C., whereby the desired shrinkable polyamide film can be obtained. The reason for employing a copolymer composed of 6,6-nylon/6-nylon in a weight ratio of from 5/95 to 25/75 is to lower the crystallinity and thereby to increase the hydrothermal shrinking ratio. If the 6,6-nylon component is less than 5% by weight, the crystallinity is still strong, the hydrothermal shrinking ratio of the film thereby obtained is low, and the shrinkage stress and Young's modulus are great, whereby the film does not well fit on the content, and does not make a substantial difference from the conventional polyamide shrinkable films.

As the proportion of the 6,6-nylon component increases, the shrinkage stress and Young's modulus decrease and the film thereby obtainable becomes to be suitable for shrink wrapping. However, if the 6,6-nylon component exceeds 25% by weight, the shrinkage stress tends to be too low, thus giving rise to the following problem.

Namely, the shrinkable polyamide film of the present invention does not per se provide effective sealing, and in many cases, a low density polyethylene is laminated thereon as a sealant. Accordingly, the shrinking ratio of the laminated film as a whole is important. If the 6,6-nylon component exceeds 25% by weight, the hydrothermal shrinkage stress tends to be too low, and the overall shrinking ratio tends to decrease due to the resistance of the sealant. Further, in order to minimize the resistance of the sealant, it is preferable to use a polyethylene having a large melt index even when the weight ratio of the nylon is within the above-mentioned range. The thickness of the film of the present invention is suitable from 10 to 30μ, and may optionally selected from this range depending upon the purpose for the particular application.

The stretching temperature is not more than 120° C., preferably from 60° to 90° C. If the stretching temperature exceeds 120° C., the film tends to be too soft, and the efficiency of the stretching operation will thereby be lowered. Further, the orientation thereby tends to be weak and the thermal shrinking property becomes to be poor. If the stretched film thereby obtained is wound up to obtain a product, it undergoes natural shrinkage when simply left to stand, and further, if it absorbs moisture, the degree of the natural shrinkage increases, thus giving rise to a serious hindrance for the subsequent steps such s printing and laminating. In order to prevent this difficulty, it is common to subject the stretched film to heat treatment at a high temperature, thereby to impart dimensional stability. For instance, in the case of a biaxially stretched polyamide film, it is common that the film is subjected to heat treatment at a temperature of at least 180° C., whereby adequate dimensional stability is imparted thereto. However, in the case of a shrinkable film, if it is subjected to such high temperature heat treatment, its hydrothermal shrinking ratio becomes low and thus it will not be qualified as a shrinkable film. In order to solve this problem, the present inventors have conducted various studies, and as a result, have found a method whereby both the demensional stability and the hydrothermal shrinking ratio can be increased by subjecting the stretched film to stress relaxation treatment at a temperature from the stretching temperature to 170° C. The stress relaxation here is meant to reduce the stress formed by the stretching, and generally, the stress relaxation is considered to have been completed when the stress is reduced at most 10% of the maximum stress formed by the streching. The stress relaxation treatment can be continuously carried out subsequent to the stretching operation, or it can be carried out by a separate device immediately after the stretched film is once wound up. The lower the temperature of the stress relaxation treatment is, the greater, the hydrothermal shrinking ratio becomes. However, a longer period of time is required at such a low temperature. Therefore, usually the temperature is set at a moderately high level to facilitate the stress relaxation. Specifically, the temperature is from the stretching temperature to 170° C., preferably from 110° to 140° C.

Usually, the final heat treatment of a stretched polyamide film is carried out at an extremely high temperature, i.e. at a temperature of 20° C. below the melting point to the melting point. This is intended to increase the crystallinity of the stretched film to the maximum level and to obtain the maximum dimentional stability under any condition. In this sense, this is almost heat-setting. On the other hand, stress relaxation treatment, i.e. low temperature heat treatment, used for the shrinkable film is designed to obtain the dimensional stability in the normal atmospheric condition only and to obtain the maximum shrinkage in hot water or in a high temperature atmosphere. Accordingly, it is designed to decrease the crystallinity as far as possible, to minimize strong bonds such as crystallines and to maximize weak bonds so that the dimensional stability is obtainable simply by removing the stress.

As a method for producing an amorphous film, there is known a method wherein a T-die is used, or a method wherein a ring die is used. The amorphous film may be produced in accordance with known conditions. The non-stretched film thereby obtained may be transferred to the subsequent stretching step in the dried state or after subjecting it to wetting treatment, as the case requires. The stretching method may be optionally selected from known methods such as a consecutive two stage stretching method and simultaneous biaxial stretching methods including a tentering method and a inflation method.

As a method for imparting gas impermeability, it is well known to coat a polyvinylidene chloride resin on a film. However, it is impossible to simply coat such a polyvinylidene chloride resin on the surface of the above-mentioned shrinkable polyamide film, because the film tends to shrink by the heat of the drying step after the coating and by the effect of water in the case where a latex is used, whereby the shrinking ratio of the coated film becomes extremely poor. This is a reason why a shrinkable film having satisfactory gas impermeability has not been available. This is also true with respect to shrinkable films other than a polyamide film.

The present inventors have made studies on a method to impart gas impermeability while maintaining the shrinking ratio and the shrinkage stress within the proper ranges, and as a result, the present invention has been accomplished.

Namely, a substantially amorphous film composed of the above mentioned 6,6-nylon/6-nylon copolymer is used as the base sheet, and a polyvinylidene chloride resin is applied thereon. The coated film is then biaxially stretched at a temperature of not higher than 120° C. and at a stretching ratio of at least 2.5 times in both MD and TD, and further subjected to stress relaxation at a temperature of from the stretching temperature to 170° C., followed by winding it up. The coating amount of the polyvinylidene chloride resin is controlled so that its solid weight after the stretching becomes to be at least 0.5 g/m$^2$, depending upon the stretching ratio.

The polyvinylidene chloride resin is a copolymer of vinylidne chloride with other component such as acrylic acid, an ester of acrylic acid, methacrylic acid, an ester of methacrylic acid, vinyl chloride, etc., and the vinylidene chloride content is at a level of about 90%.

In order to impart the gas impermeability while mainting the proper shrinking ratio, a so-called precoating method is essential in which the polyvinylidene chloride resin is coated prior to the stretching. Only by this precoating method, it is possible to obtain a shrinkable film which satisfies all of the required shrinking ratio, shrinkage stress and gas impermeability.

The amorphous film may be produced in accordance with a known method such as a method in which a T-die is used or a method in which a ring die is used. In the case of a simultaneous biaxial stretching method, the non-stretched film thus obtained is coated with the vinylidene chloride resin so that its solid weight after the stretching becomes to be at least 0.5 g/m$^2$ and then subjected to the simultaneous biaxial stretching.

As the coating method, there may be used an air knife method in the case of a tentering method stretching, or a dipping method in the case of an inflation method stretching. However, the coating method is not limited to these methods.

In the case of a consecutive two stage stretching method, the film is biaxially stretched consecutively in the two directions of MD and TD after coating the vinylidene chloride resin. Or, the vinylidene chloride resin is applied after stretching the film in one of the TD and MD directions, and then the film is stretched in the other direction. In this case, the air knife method is suitable as the coating method. However, the coating method is not limited to this specific method.

As described in detail in the foregoing, according to the present invention, it is now possible to produce a shrinkable nylon film having a good shrinking rate and a proper shrinkage stress and to produce a shrinkable nylon film having gas impermeability as well as the good shrinking rate and shrinkage stress. Further developments in future are very much expected in the packaging and wrapping fields.

Now, the present invention will specifically be described by presenting the following Examples.

EXAMPLE 1

A polyamide copolymer composed of 6,6-nylon/6-nylon with a 6,6-nylon content of 15% by weight (the relative viscosity being 2.8 as measured in a 95% sulfuric acid solution at 25° C.) was extruded in a thickness of 150μ by a T-die method by means of an extruder having an orifice diameter of 90 mm, whereby a substantially amorphous film was obtained. The film was simultaneously biaxially stretched three times in both MD and TD at 70° C. by the tentering method, and then subjected to stress relaxation at a temperature of 120° C. for 15 seconds. Thereafter, the film was wound up, whereupon a transparent film having an average thickness of 16.5μ was obtained.

As shown in Table 1, this film had extremely good hydrothermal shrinking ratio, natural shrinking ratio (i.e. dimensional stability) and mechanical properties.

TABLE 1

| Example | Hydrothermal shrinking ratio % | | Natural shrinking ratio % | | Strength Kg/mm$^2$ | | Elongation % | | Young's modulus Kg/mm$^2$ | |
| --- | --- | --- | --- | --- | --- | --- | --- | --- | --- | --- |
| | MD | TD | MD | TD | MD | TD | MD | TD | MD | TD |
| 1 | 35 | 36 | 3.0 | 1.5 | 27 | 27 | 120 | 102 | 72 | 72 |

EXAMPLE 2

A film was prepared in the same manner as in Example 1 except that the 6,6-nylon content was 10% by weight, and its physical properties were investigated in the same manner as in Example 1. As a result, a thermally shrinkable film having the properties shown in Table 2 was obtained.

TABLE 2

| Example | Hydrothermal shrinking ratio % | | Natural shrinking ratio % | | Strength Kg/mm² | | Elongation % | | Young's modulus Kg/mm² | |
|---|---|---|---|---|---|---|---|---|---|---|
| | MD | TD | MD | TD | MD | TD | MD | TD | MD | TD |
| 2 | 33 | 34 | 3.0 | 1.5 | 27 | 27 | 114 | 100 | 84 | 85 |

EXAMPLE 3

The substantially amorphous film obtained in Example 1 was subjected to consecutive two stage stretching (MD: 3.0 times, temperature: 60° C., TD: 3.5 times, temperature: 80° C.) by means of a biaxial stretching tester (Bistron manufactured by Iwamoto Seisakusho) to obtain a stretched film. The stretched film was subjected to stress relaxation treatment at 120° C. for 15 seconds. As a result, a thermally shrinkable film having the properties shown in Table 3 was obtained.

TABLE 3

| Example | Hydrothermal shrinking ratio % | | Natural shrinking ratio % | | Strength Kg/mm² | | Elongation % | | Young's modulus Kg/mm² | |
|---|---|---|---|---|---|---|---|---|---|---|
| | MD | TD | MD | TD | MD | TD | MD | TD | MD | TD |
| 3 | 34 | 37 | 3.0 | 3.0 | 27 | 28 | 115 | 98 | 72 | 73 |

EXAMPLE 4

The same polyamide starting material as used in Example 1 was extruded by an extruder having an orifice diameter of 90 mm and the film thereby obtained was stretched by the inflation method (stretching temperature: 80° C., stretching ratio: 3.0 times in MD and 3.0 times in TD) to obtain a stretched film, which was then subjected to stress relaxation treatment at 120° C., whereupon a thermally shrinkable film having the properties shown in Table 4 was obtained.

TABLE 4

| Example | Hydrothermal shrinking ratio % | | Natural shrinking ratio % | | Strength Kg/mm² | | Elongation % | | Young's modulus Kg/mm² | |
|---|---|---|---|---|---|---|---|---|---|---|
| | MD | TD | MD | TD | MD | TD | MD | TD | MD | TD |
| 4 | 35 | 35 | 2.5 | 2.5 | 27 | 27 | 105 | 112 | 75 | 75 |

EXAMPLE 5

A polyamide copolymer composed of 6,6-nylon/6-nylon with a 6,6-nylong content of 15% by weight and having a relative viscosity of 2.8 as measured in a 95% sulfuric acid solution at 25° C., was extruded in a thickness of 150μ by the T-die method by means of an extruder having an orifice diameter of 90 mm, whereby a substantially amorphous film was obtained. This film was coated with polyvinylidene chloride so as to give its solid weight of 17 g/m², and the coated film was simultaneously biaxially stretched 3.0 times in both MD and TD at 70° C. and subjected to stress relaxation at a temperature of 120° C. for 15 seconds, whereupon a transparent film having an average thickness of 17.5μ was obtained. The thickness of the polyvinylidene chloride coating of this stretched film was about 1μ (1.7 g/m²). As shown in Table 5, this film had good hydrothermal shrinking ratio, dimensional stability and mechanical properties as well as extremely good oxygen impermeability.

TABLE 5

| Example | Hydrothermal shrinking ratio % | | Natural shrinking ratio % | | Strength Kg/mm² | | Elongation % | | Young's modulus Kg/mm² | | O₂TR(cc/m² · 24 hrs · atm) | |
|---|---|---|---|---|---|---|---|---|---|---|---|---|
| | MD | TD | MD | TD | MD | TD | MD | TD | MD | TD | Before shrinkage | After shrinkage |
| 5 | 32 | 34 | 3 | 1.5 | 25 | 26 | 120 | 115 | 75 | 75 | 6.0 | 11.5 |

EXAMPLE 6

The substantially amorpous film obtained in Example 5 was coated with polyvinylidene chloride in a solid weight amount of 10 g/m², then subjected to two stage biaxial stretching (3.0 times in MD at 70° C. and 3.5 times in TD at 80° C.) and thereafter subjected to stress relaxation treatment at 120° C. for 15 seconds, whereupon a transparent film having an average thickness of 15μ was obtained. The thickness of the polyvinylidene chloride coating of the stretched film thereby obtained was about 0.6μ (1 g/m²). A thermal shrinkable film having the properties as shown in Table 6 was obtained.

TABLE 6

| Example | Hydrothermal shrinking ratio % | | Natural shrinking ratio % | | Strength Kg/mm² | | Elongation % | | Young's modulus Kg/mm² | | O₂TR(cc/m² · 24 hrs · atm) | |
|---|---|---|---|---|---|---|---|---|---|---|---|---|
| | MD | TD | MD | TD | MD | TD | MD | TD | MD | TD | Before shrinkage | After shrinkage |
| 6 | 32 | 35 | 3.0 | 3.5 | 25 | 26 | 120 | 110 | 75 | 75 | 11 | 20 |

EXAMPLE 7

A film was prepared in the same manner as in Example 5 except that the 6,6-nylon content was 10% by weight, and its physical properties were investigated in the same manner as in Example 5. It was a thermally shrinkable film having the properties shown in Table 7.

TABLE 7

| Example | Hydrothermal shrinking ratio % | | Natural shrinking ratio % | | Strength Kg/mm² | | Elongation % | | Young's modulus Kg/mm² | | $O_2TR(cc/m^2 \cdot 24\ hrs \cdot atm)$ | |
|---|---|---|---|---|---|---|---|---|---|---|---|---|
| | MD | TD | MD | TD | MD | TD | MD | TD | MD | TD | Before shrinkage | After shrinkage |
| 7 | 30 | 32 | 3 | 1.5 | 25 | 26 | 112 | 110 | 85 | 85 | 5.5 | 11 |

The films obtained by Examples 1, 2, 4, 5 and 7 were respectively laminated with 25μ of a low density polyethylene (i.e. Sumikasen L211), and the laminated films were used for wrapping hams and sausages. The efficiency of the operation and the outer appearance of the wrappings were extremely good.

The films of Examples 5 and 7 were found to be especially good for the storage of the hams and sausages.

COMPARATIVE EXAMPLE

Extrusion and stretching tests were carried out by differentiating the ratio of 66-nylon/6-nylon. The results obtained by the comparison of the shrinking ratios, and the shrinkage stresses thereby obtained are shown in Table 8.

TABLE 8

| 6,6-component % by weight | Hydrothermal shrinking ratio % | Natural shrinking ratio % | Hydrothermal shrinkage stress g/mm² |
|---|---|---|---|
| 2.5 | 23 | 4 | 800 |
| 5.0 | 30 | 4 | 600 |
| 10.0 | 33 | 3 | 520 |
| 15.0 | 35 | 3 | 460 |
| 20.0 | 35 | 3 | 350 |
| 30.0 | 40 | 5 | 10 |

As shown in Table 8, when the 6,6-nylon component is 5.0% or less, the shrinking ratio is low and the shrinkage stress is high, thus leading to problems for practical applications. On the other hand, when the 6,6-nylon component is more than 25%, the shrinkage stress is too small although the shrinking ratio is good. Thus, this involves practical problems as mentioned above. The values presented in the Table are average values of MD and TD.

We claim:

1. A biaxially stretched shrinkable polyamide film composed of a copolymer of 6,6-nylon/6-nylon in a weight ratio within a range of from 5/95 to 25/75 coated, on at least one side thereof, with a polyvinylidene chloride resin and having a hydrothermal shrinking ratio of at least 30% in both MD and TD, a hydrothermal shrinkage stress of from 300 to 700 g/mm² and an oxygen gas permeability of not more than 20 cc/m²·24 hrs. atm. as measured by the Mocon method.

* * * * *